US012602267B2

(12) United States Patent
Ahuja et al.

(10) Patent No.: US 12,602,267 B2
(45) Date of Patent: Apr. 14, 2026

(54) DYNAMIC APPLICATION PROGRAMMING INTERFACE MODIFICATION TO ADDRESS HARDWARE DEPRECIATION

(71) Applicant: Bank of America Corporation, Charlotte, NC (US)

(72) Inventors: Yogi Ahuja, Warwick, PA (US); Shiva Veluru, Plano, TX (US)

(73) Assignee: Bank of America Corporation, Charlotte, NC (US)

( * ) Notice: Subject to any disclaimer, the term of this patent is extended or adjusted under 35 U.S.C. 154(b) by 572 days.

(21) Appl. No.: 18/096,237

(22) Filed: Jan. 12, 2023

(65) Prior Publication Data

US 2024/0241773 A1     Jul. 18, 2024

(51) Int. Cl.
*G06F 9/54* (2006.01)
*G06F 11/30* (2006.01)
*G06F 11/34* (2006.01)

(52) U.S. Cl.
CPC .......... *G06F 9/541* (2013.01); *G06F 11/3034* (2013.01); *G06F 11/3409* (2013.01)

(58) Field of Classification Search
CPC .......... G06F 9/541; G06F 9/542; G06F 9/543; G06F 9/544; G06F 9/545; G06F 9/546; G06F 9/547; G06F 9/548
See application file for complete search history.

(56) References Cited

U.S. PATENT DOCUMENTS

| | | | |
|---|---|---|---|
| 6,587,833 B1 | 7/2003 | Ruffin et al. | |
| 6,938,027 B1 | 8/2005 | Barritz et al. | |
| 7,225,137 B1 | 5/2007 | Barritz | |
| 7,616,583 B1 | 11/2009 | Power et al. | |
| 9,898,357 B1 * | 2/2018 | Viswanathan | ........ G06F 11/079 |
| 10,019,195 B1 * | 7/2018 | Azmandian | ......... G06F 11/3055 |
| 11,531,286 B2 | 12/2022 | Shigihara et al. | |
| 11,544,554 B2 | 1/2023 | Shimasaki et al. | |
| 11,551,272 B2 | 1/2023 | Chaudhary et al. | |
| 2001/0056386 A1 | 12/2001 | O'Halloran et al. | |
| 2004/0083188 A1 | 4/2004 | Lee et al. | |
| 2008/0307197 A1 | 12/2008 | Calvin et al. | |
| 2011/0299068 A1 | 12/2011 | Glandt et al. | |
| 2012/0290454 A1 | 11/2012 | Jameson | |

(Continued)

*Primary Examiner* — Lewis A Bullock, Jr.
*Assistant Examiner* — John Robert Dakita Ewald
(74) *Attorney, Agent, or Firm* — Banner & Witcoff, Ltd.

(57)     ABSTRACT

Aspects of the disclosure relate to application programming interface (API) modification. A computing platform may receive, from an API host service, API property identifiers and corresponding sector storage information. The computing platform may test, for a first property corresponding to a first API property identifier of the API property identifiers, a plurality of sectors of a storage system used to store information for the first property. Based on identifying that a performance success rate of the plurality of sectors meets or exceeds the performance threshold, the computing platform may update a property sector detection log to indicate that collection of the information for the first property is supported by the storage system. Based on identifying that the performance success rate is less than the performance threshold, the computing platform may perform one or more storage mitigation actions for the first property.

18 Claims, 9 Drawing Sheets

(56) References Cited

U.S. PATENT DOCUMENTS

| | | | |
|---|---|---|---|
| 2013/0151774 A1* | 6/2013 | Bolik | G06F 11/3485 |
| | | | 711/E12.017 |
| 2013/0332303 A1 | 12/2013 | Schank et al. | |
| 2019/0042126 A1* | 2/2019 | Sen | G11C 8/12 |
| 2019/0333599 A1* | 10/2019 | Danjean | G06F 11/1068 |
| 2020/0027518 A1* | 1/2020 | Caraher | G11C 29/38 |
| 2020/0320584 A1 | 10/2020 | Rabenold | |
| 2021/0239927 A1 | 8/2021 | Rivaud et al. | |
| 2021/0312511 A1 | 10/2021 | Chaudhary et al. | |
| 2022/0122684 A1* | 4/2022 | Pecha | G11C 29/4401 |
| 2022/0309362 A1 | 9/2022 | Levesque et al. | |
| 2022/0309385 A1 | 9/2022 | Levesque et al. | |
| 2023/0003809 A1 | 1/2023 | Mizoguchi | |
| 2023/0011847 A1 | 1/2023 | Sung et al. | |
| 2023/0393774 A1* | 12/2023 | Geedh | G06F 3/0655 |

* cited by examiner

100

305

Hardware Replacement Notification

The number of functional sectors for Property #1 fails to meet a predetermined performance threshold.  Please update the hardware associated with these sectors.

API Property Status Log

| APIID | PropertyID | Status |
|-------|-----------|--------|
| API1 | Property1 | Collect |
| API1 | Property2 | Don't Collect |
| API2 | Property1 | Don't Collect |
| API2 | Property2 | Collect |
| API2 | Property3 | Collect |
| API3 | Property1 | Collect |

FIG. 4

DYNAMIC APPLICATION PROGRAMMING INTERFACE MODIFICATION TO ADDRESS HARDWARE DEPRECIATION

BACKGROUND

Aspects of the disclosure relate to application programming interface (API) modification. Over time, depreciation of hard disk and/or solid-state drives may occur due to factors such as heavy usage, power failure, or the like. Such depreciation may result in software crashes and/or performance delays for APIs, as storage of collected API information may be impacted by the depreciation, which may negatively impact user experience. Accordingly, it may be important to reduce or eliminate the effects of such depreciation as related to API performance.

SUMMARY

Aspects of the disclosure provide effective, efficient, scalable, and convenient technical solutions that address and overcome the technical problems associated with hardware depreciation. In accordance with one or more embodiments of the disclosure, a computing platform comprising at least one processor, a communication interface, and memory storing computer-readable instructions may receive, from an application programming interface (API) host service, API property identifiers and corresponding sector storage information. The computing platform may test, for a first property corresponding to a first API property identifier of the API property identifiers, a plurality of sectors of a storage system used to store information for the first property, which may include: 1) identifying, by dividing the plurality of sectors of the storage system by the sector storage information for the first property, a number of sector groups that may be used by the storage system to store the information for the first property, 2) attempting storage, in each of the sector groups, of the information for the first property. 3) identifying a number of failed sectors comprising sectors, of the plurality of sectors of the storage system, that failed to successfully complete the storage and a number of successful sectors comprising sectors, of the plurality of sectors of the storage system, that successfully completed the storage, and 4) identifying, by dividing the number of successful sectors by the plurality of sectors of the storage system, a performance success rate. The computing platform may compare the performance success rate to a performance threshold. Based on identifying that the performance success rate meets or exceeds the performance threshold, the computing platform may update a property sector detection log to indicate that collection of the information for the first property is supported by the storage system. Based on identifying that the performance success rate is less than the performance threshold, the computing platform may perform one or more storage mitigation actions for the first property.

In one or more instances, the API property identifiers may indicate properties, corresponding to the API host service, for which information may be collected. In one or more instances, the sector storage information may indicate, for each of the properties, a number of sectors needed to store the corresponding information.

In one or more examples, the property identifiers may indicate one or more of: an image, text, a video, or a number. In one or more examples, the computing platform may identify a number of times within a predetermined period of time that the first property is accessed. The computing platform may dynamically adjust the performance threshold based on the identified number of times, where the performance threshold may be dynamically reduced or increased proportionally based on the identified number of times.

In one or more instances, the property detection sector log may indicate API host service identifiers, the API property identifiers, and collection statuses of the API property identifiers. In one or more instances, the one or more storage mitigation actions may include: 1) identifying, based on a list of mandatory properties, whether collection of the information for the first property is optional; 2) based on identifying that the collection of the information for the first property is optional, updating the property sector detection log to indicate that the collection of the information for the first property should not be performed; and 3) sending, to the API host service, an automated signal indicating that the collection of the information for the first property should not be performed, which may cause the API host service to skip collection of the information for the first property while collecting information for the properties corresponding to the remaining API identifiers.

In one or more examples, based on identifying that the collection of the information for the first property is mandatory, the computing platform may: 1) update the property sector detection log to indicate that the collection of the information for the first property should be temporarily suspended; 2) send, to an administrator device, a hardware replacement notification and one or more commands directing the administrator device to display the hardware replacement notification, which may cause the administrator device to display the hardware replacement notification, and where the hardware replacement notification may indicate that the storage system should be replaced; 3) receive, from the administrator device, an indication that the storage system has been replaced; and 4) update the property sector detection log to indicate that the collection of the information for the first property should be resumed.

In one or more instances, based on identifying that the collection of the information for the first property is mandatory, the computing platform may perform an automated repair of the storage system. In one or more instances, the storage system may be one of: a solid state drive (SSD), hard disk drive (HDD), or a database server.

In one or more examples, testing the plurality of sectors may occur at a predetermined interval. In one or more examples, the API host service may be configured to: 1) identify, by accessing the property sector detection log, that the information for the first property should be collected; 2) identify the information for the first property; and 3) store, using a subset of the plurality of sectors of the storage system corresponding to the sector storage information for the first property, the information for the first property.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 3 and 4 depict illustrative graphical user interfaces for using API modification to address hardware depreciation in accordance with one or more example embodiments;

DETAILED DESCRIPTION

In the following description of various illustrative embodiments, reference is made to the accompanying drawings, which form a part hereof, and in which is shown, by way of illustration, various embodiments in which aspects of the disclosure may be practiced. In some instances, other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As a brief introduction of the concepts described in further detail below, systems and methods to mitigate technical challenges presented by hardware depreciation are provided. For example, overtime hard disk and/or solid state drive (SDD) depreciation may occur due to various factors such as heavy usage, power failure, and/or other information. Accordingly, this may result in or cause a lag in API performance. To address this deficiency, a property sector detector may identify whether the property (e.g., properties of an API service such as images, text strings, numbers, videos, and/or other properties) may fit in each sector (e.g., a subdivision of storage resources, for a given storage system such as an SSD, hard disk, or other system, configured to store a fixed amount of data) efficiently. If a property does not fit in a sector, it may be marked as a bad sector. If more than a threshold number of sectors are marked as bad (and/or less than a threshold number of sectors are marked as good), the corresponding property may be marked, and the property may be removed based on an identification of whether that property is optional or required.

Figure 1A:
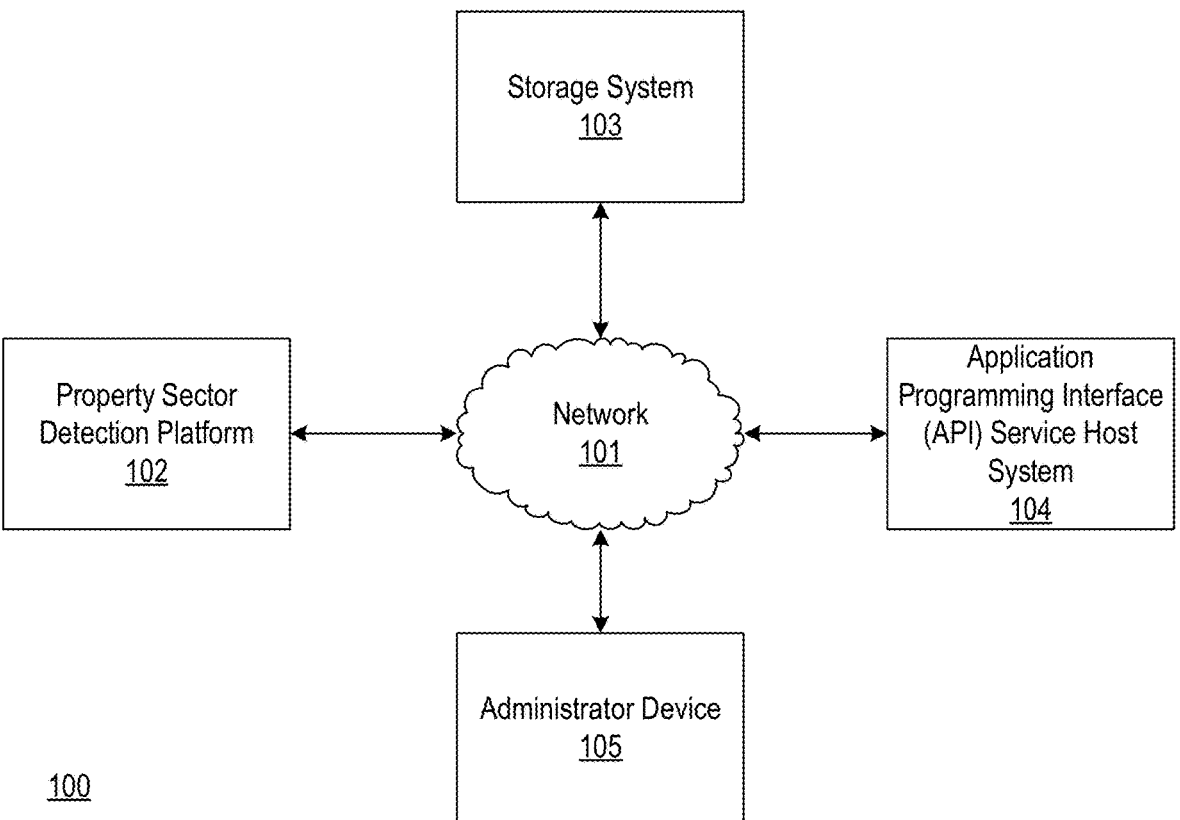
FIGS. 1A-1B depict an illustrative computing environment for using API modification to address hardware depreciation in accordance with one or more example embodiments.
Figure 1B:
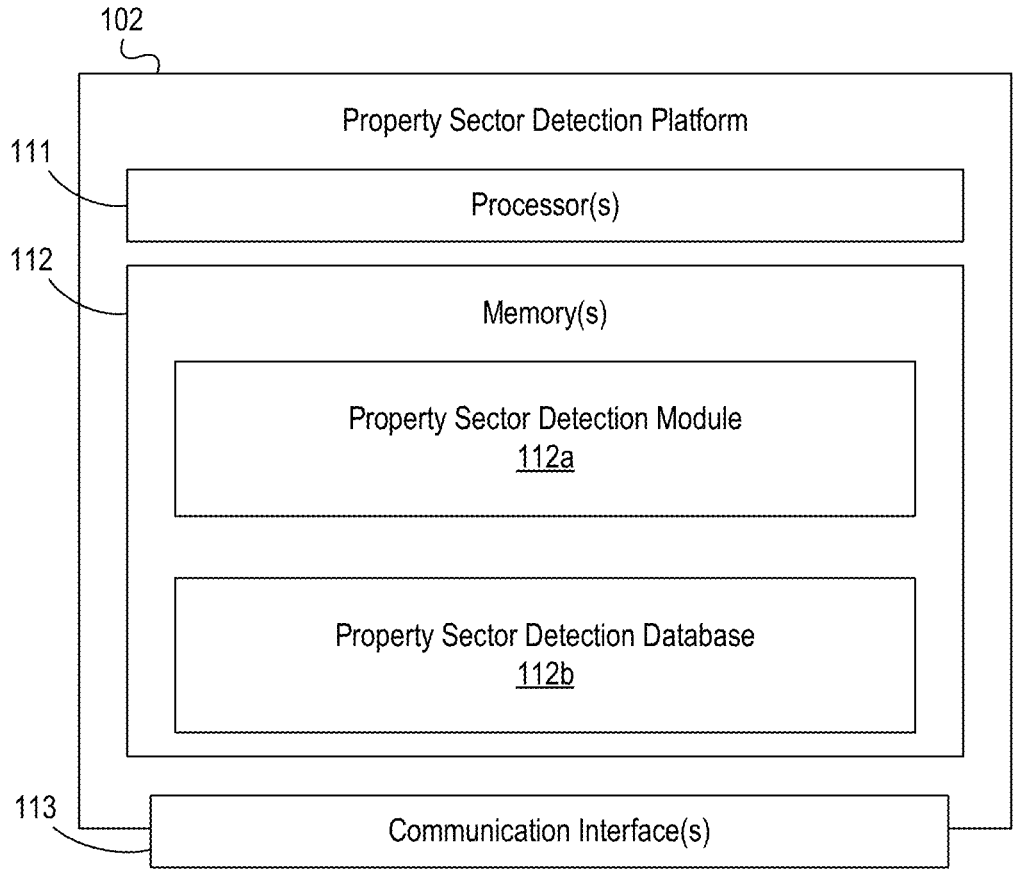

FIGS. 1A-1B depict an illustrative computing environment for using API modification to address hardware depreciation. Referring to FIG. 1A, computing environment 100 may include one or more computer systems. For example, computing environment 100 may include property sector detection platform 102, storage system 103, API service host system 104, and administrator device 105.

As described further below, property sector detection platform 102 may be a computer system that includes one or more computing devices (e.g., servers, server blades, or the like) and/or other computer components (e.g., processors, memories, communication interfaces, and/or other components) that may be used to provide API modifications to address deficiencies caused by hardware depreciation as described further below.

Storage system 103 may be a computer system that includes one or more computing devices (e.g., servers, server blades, or the like) and/or other computing components (e.g., processors, memories, communication interfaces, and/or other components) that may be configured to store information of properties for an API. For example, the storage system 103 may include a plurality of sectors configured to perform the storage. In some instances, the storage system 103 may be a hard disk drive (HDD), SSD, database, and/or other storage system.

API service host system 104 may be a computer system that includes one or more computing devices (e.g., servers, server blades, or the like) and/or other computing components (e.g., processors, memories, communication interfaces, and/or other components) that may be configured to make API calls to obtain information of various properties (e.g., images, text strings, videos, numbers, and/or otherwise). In some instances, to obtain the information, the API service host system 104 may be configured for communication with the storage system 103.

Administrator device 105 may be and/or otherwise include a laptop computer, desktop computer, mobile device, tablet, smartphone, and/or other device that may be used by an individual (such as an employee of an enterprise organization corresponding to the storage system 103) to monitor and/or otherwise maintain storage resources accessible by the API service host system 104. In some instances, administrator device 105 may be configured to display one or more user interfaces (e.g., hardware replacement notifications, sector performance interfaces, or the like).

Computing environment 100 also may include one or more networks, which may interconnect property sector detection platform 102, storage system 103, API service host system 104, and administrator device 105. For example, computing environment 100 may include a network 101 (which may interconnect, e.g., property sector detection platform 102, storage system 103, API service host system 104, and administrator device 105).

In one or more arrangements, property sector detection platform 102, storage system 103, API service host system 104, and administrator device 105 may be any type of computing device capable of sending and/or receiving requests and processing the requests accordingly. For example, property sector detection platform 102, storage system 103, API service host system 104, administrator device 105, and/or the other systems included in computing environment 100 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of property sector detection platform 102, storage system 103, API service host system 104, and/or administrator device 105 may, in some instances, be special-purpose computing devices configured to perform specific functions.

Referring to FIG. 1B, property sector detection platform 102 may include one or more processors 111, memory 112, and communication interface 113. A data bus may interconnect processor 111, memory 112, and communication interface 113. Communication interface 113 may be a network interface configured to support communication between property sector detection platform 102 and one or more networks (e.g., network 101, or the like). Memory 112 may include one or more program modules having instructions that when executed by processor 111 cause property sector detection platform 102 to perform one or more functions described herein and/or one or more databases that may store and/or otherwise maintain information which may be used by such program modules and/or processor 111. In some instances, the one or more program modules and/or databases may be stored by and/or maintained in different memory units of property sector detection platform 102 and/or by different computing devices that may form and/or otherwise make up property sector detection platform 102. For example, memory 112 may have, host, store, and/or include property sector detection module 112a and property sector detection database 112b.

Property sector detection module 112a may have instructions that direct and/or cause property sector detection platform 102 to provide improved techniques to mitigate hardware depreciation effects on API systems, as discussed in greater detail below. Property sector detection database 112b may store information used by property sector detection module 112a and/or property sector detection platform 102 in application of advanced techniques to mitigate hardware depreciation effects on API systems, and/or in performing other functions.

Figure 2A:
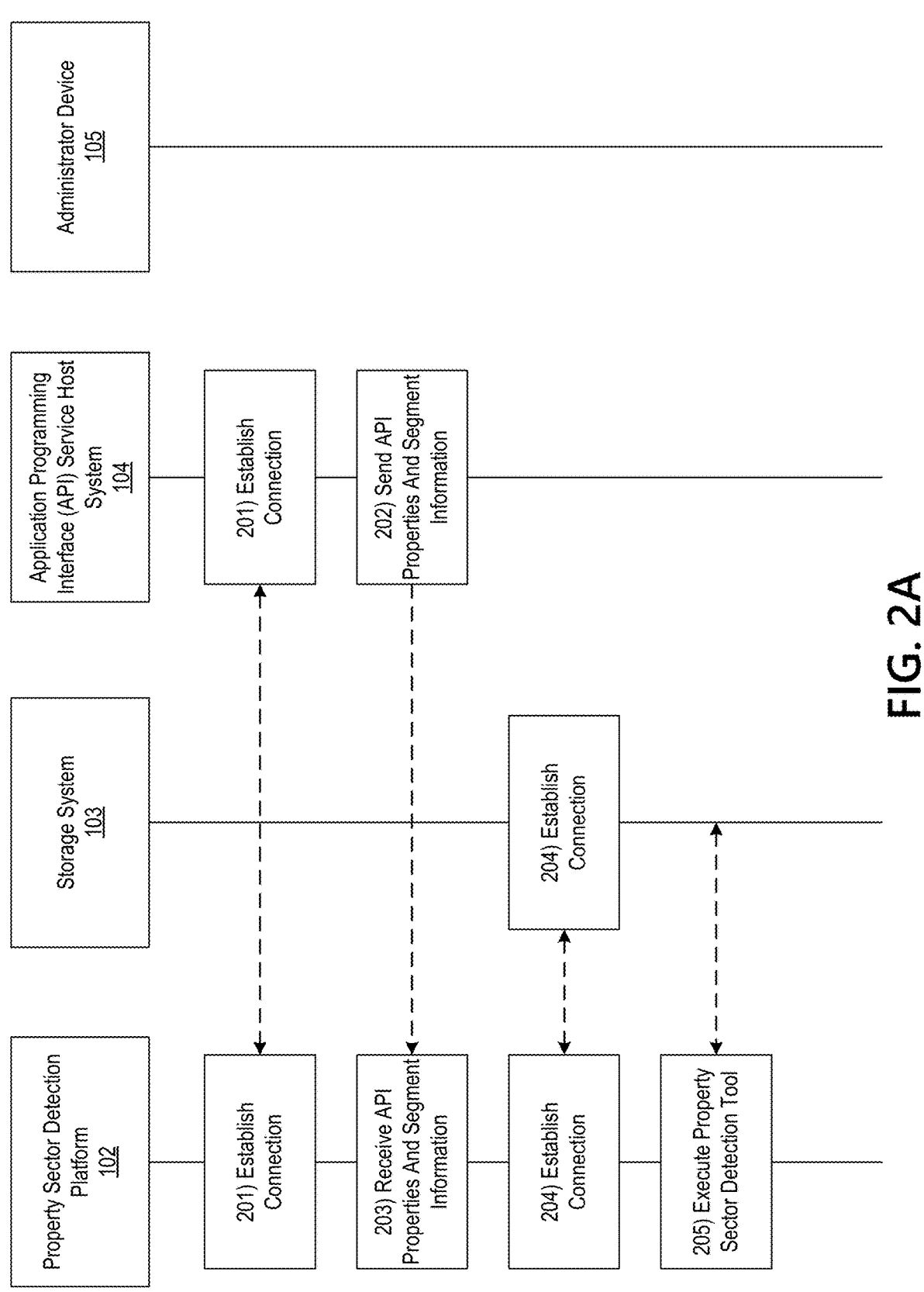
FIGS. 2A-2D depict an illustrative event sequence for using API modification to address hardware depreciation in accordance with one or more example embodiments.

FIGS. 2A-2D depict an illustrative event sequence for using API modification to address hardware depreciation in accordance with one or more example embodiments. Referring to FIG. 2A, at step 201, the API service host system 104 may establish a connection with the property sector detection platform 102. For example, the API service host system 104 may establish a first wireless data connection with the property sector detection platform 102 to link the API service host system 104 to the property sector detection platform 102 (e.g., in preparation for sending API properties and/or sector information). In some instances, the API service host system 104 may identify whether or not a connection is already established with the property sector detection platform 102. If a connection is already established with the property sector detection platform 102, the API service host system 104 might not re-establish the connection. If a connection is not yet established with the property sector detection platform 102, the API service host system 104 may establish the first wireless data connection as described herein.

At step 202, the API service host system 104 may send API properties and/or sector information to the property sector detection platform 102. For example, the API service host system 104 may send properties for the API for which information may be requested (e.g., images, text strings, videos, numbers, and/or other properties). In some instances, the API service host system 104 may include property identifiers with these properties (e.g., property1, property2, or the like). In some instances, the API service host system 104 may also send sector information. For example, the API service host system 104 may send, for each property, a number of sectors to be used in storing information (e.g., by a storage system such as the storage system 103) for the corresponding property (e.g., five sectors, ten sectors, or the like). In some instances, the API service host system 104 may send the API properties and sector information to the property sector detection platform 102 while the first wireless data connection is established.

Although transmission of the API properties and sector information is shown at step 202, this is for illustrative purposes only, and updated API properties and/or sector information may be sent at any other time without departing from the scope of the disclosure. For example, the API service host system 104 may send updated API property information indicating that a property has been added or removed. Additionally or alternatively, updated sector information may be sent indicating that storage parameters for a given property have changed (e.g., the number of sectors needed to store information of a property has been reduced or increase due to, for example, enlarging an image, changing an image resolution, modifying text, changing video, modifying a numeric string, and/or otherwise).

At step 203, the property sector detection platform 102 may receive the API properties and sector information sent at step 202. For example, the property sector detection platform 102 may receive the API properties and sector information via the communication interface 113 and while the first wireless data connection is established.

At step 204, the property sector detection platform 102 may establish a connection with the storage system 103. For example, the property sector detection platform 102 may establish a second wireless data connection with the storage system 103 to link the property sector detection platform 102 to the storage system 103 (e.g., in preparation for monitoring performance of storage sectors at the storage system 103). In some instances, the property sector detection platform 102 may identify whether or not a connection is already established with the storage system 103. If a connection is already established, the property sector detection platform 102 might not re-establish the connection. If a connection is not yet established, the property sector detection platform 102 may establish the second wireless data connection as described herein.

At step 205, the property sector detection platform 102 may execute a property sector detection tool on the storage system 103. For example, for a given API (e.g., a first API hosted by the API service host system 104), the property sector detection platform 102 may identify the corresponding properties (e.g., based on the API properties sent to the property sector detection platform 102 at step 202). Then, for a given property (e.g., a first property), the property sector detection platform 102 may identify a number of sectors (e.g., of the storage system 103) that are needed for storage of information for the first property (e.g., based on the sector information received at step 203). In some instances, the property sector detection platform 102 may identify a number of sector groups that may be used to store the information for the first property. For example, the property sector detection platform 102 may divide the plurality of sectors of the storage system 103 by the number of sectors needed for storage of information for the first property to identify the number of sector groups. After identifying the number of sector groups, the property sector detection platform 102 may communicate with the storage system 103 to test storage of the information for the first property by each of the sector groups. For example, the property sector detection platform 102 and/or storage system 103 may repeat the storage process a number of times corresponding to the number of sector groups to test functionality of all sectors of the storage system 103. In doing so, the property sector detection platform 102 may distinguish between and/or log sectors that failed and/or were successful in performing the storage. After identifying which sectors failed or were successful in performing the storage, the property sector detection platform 102 may identify a performance success rate (e.g., indicating a percentage of sectors that successfully performed the storage) by dividing the number of successful sectors by the total number of sectors for the storage system 103.

Figure 2B:
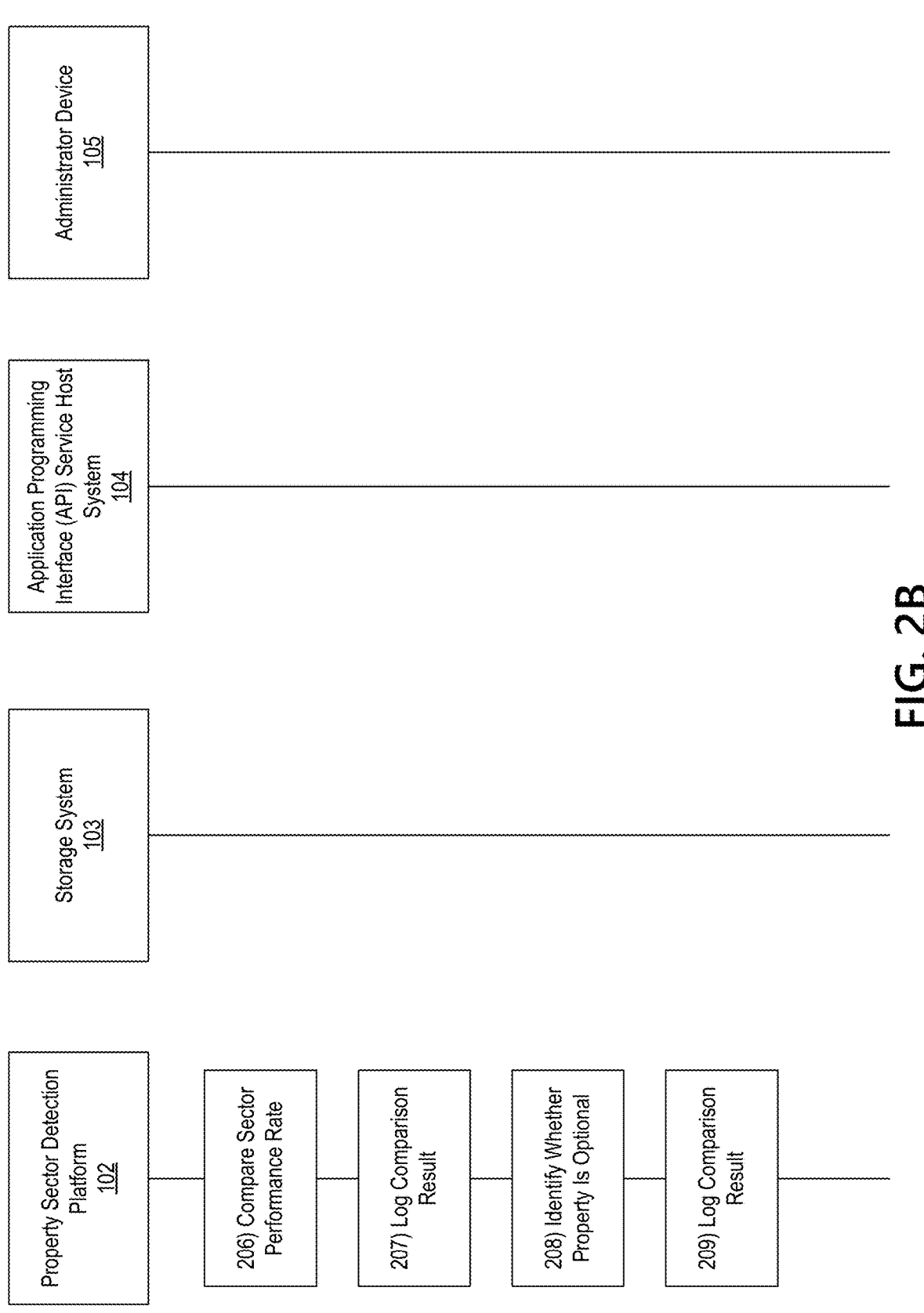

Referring to FIG. 2B, at step 206, the property sector detection platform 102 may compare the performance success rate to a performance threshold. In some instances, the property sector detection platform 102 may dynamically select and/or modify the performance threshold based on a frequency of access of the first API and/or first property. For example, the property sector detection platform 102 may log access attempts and may adjust the performance threshold accordingly (e.g., proportionally or otherwise, so as to increase the performance threshold as more access attempts are made and reduce the performance threshold as less access attempts are made). In some instances, the property sector detection platform 102 may do so to account for a level of failure tolerance associated with such different APIs and/or properties (e.g., higher frequency of access may result in less failure tolerance and vice versa). In some instances, the property sector detection platform 102 may have a tiered threshold structure for selecting and/or modifying the performance threshold (e.g., if a number of access attempts is below a first threshold, assign a first performance threshold, if equal to or above the first threshold, assign a second performance threshold, or the like). In some instances, the performance thresholds may vary by API and/or property.

If the property sector detection platform 102 identifies that the performance success rate meets or exceeds the performance threshold, the property sector detection platform 102 may proceed to step 207. If the property sector detection platform 102 identifies that the performance success rate does not meet or exceed the performance threshold, the property sector detection platform 102 may proceed to step 208.

At step 207, the property sector detection platform 102 may update a property sector performance log. For example, the property sector detection platform 102 may log that sectors of the storage system 103 have sufficient performance to adequately store information of the first property, and that such information should continue to be collected (e.g., as shown in property sector performance log 405, which is shown in FIG. 4). Then the event sequence may proceed to step 215.

Returning to step 206, if the property sector detection platform 102 identified that the performance success rate did not meet or exceed the performance threshold, the property sector detection platform 102 may proceed to step 208 to perform one or more storage mitigation actions. At step 208, the property sector detection platform 102 may identify whether or not the first property is optional. For example, the property sector detection platform 102 may compare an identifier of the first property to a list of optional or mandatory properties for the first API. In some instances, this list of optional or mandatory properties may dynamically evolve based on changing conditions of the first API. If the property sector detection platform 102 identifies that the first property is optional, the property sector detection platform 102 may proceed to step 209. Otherwise, if the property sector detection platform 102 identifies that the first property is mandatory, the property sector detection platform 102 may proceed to step 210.

At step 209, the property sector detection platform 102 may update the property sector performance log. For example, the property sector detection platform 102 may log that sectors of the storage system 103 do not have sufficient performance to adequately store information of the first property, and because the collection of the information corresponding to the first property is optional, such information should not be collected. In some instances, the property sector detection platform 102 may send an automated signal to the API service host system 104, directing the API service host system 104 not to collect the information of the first property (which may, e.g., cause the API service host system 104 not to collect the information going forward). The event sequence may then proceed to step 215.

Figure 2C:
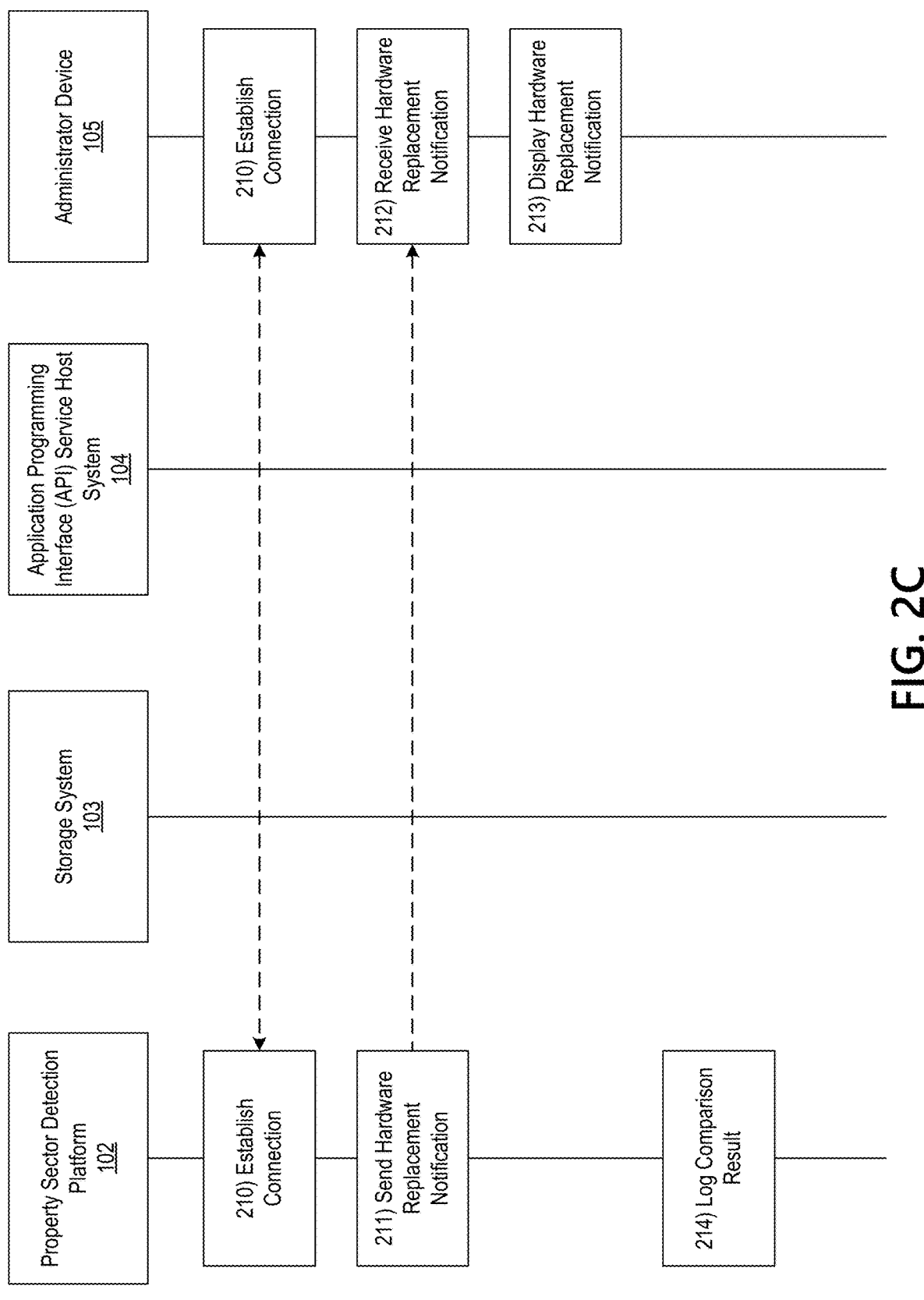

Returning to step 208, if the property sector detection platform 102 identified that the first property was mandatory, the property sector detection platform 102 may have proceeded to step 210. Referring to FIG. 2C, at step 210, the property sector detection platform 102 may establish a connection with the administrator device 105. For example, the property sector detection platform 102 may establish a third wireless data connection with the administrator device 105 (e.g., in preparation for sending hardware replacement notifications). In some instances, the property sector detection platform 102 may identify whether or not a connection is already established with the administrator device 105. If a connection is already established with the administrator device 105, the property sector detection platform 102 might not re-establish the connection. If a connection is not yet established with the administrator device 105, the property sector detection platform 102 may establish the third wireless data connection as described herein.

At step 211, the property sector detection platform 102 may send a hardware replacement notification to the administrator user device 105. For example, the property sector detection platform 102 may send a notification indicating that the performance of the storage system 103 has fallen below an acceptable performance threshold (e.g., due to failure of the corresponding sectors), and because collection of information for the first property is mandatory, the storage system 103 must be repaired and/or replaced. In some instances, the property sector detection platform 102 may send the hardware replacement notification via the communication interface 113 and while the third wireless data connection is established. In some instances, the property sector detection platform 102 may also send one or more commands directing the administrator user device 105 to display the hardware replacement notification.

At step 212, the administrator device 105 may receive the hardware replacement notification sent at step 211. For example, the administrator device 105 may receive the hardware replacement notification while the third wireless data connection is established. In some instances, the administrator device 105 may also receive the one or more commands directing the administrator device 105 to display the hardware replacement notification.

At step 213, based on or in response to the one or more commands directing the administrator device 105 to display the hardware replacement notification, the administrator device 105 may display the hardware replacement notification. For example, the administrator device 105 may display a graphical user interface similar to graphical user interface 305, which is shown in FIG. 3. For example, the administrator device 105 may display an indication that a number of functional sectors of the storage system 103 fails to meet a performance threshold, and that the storage system 103 should be repaired or replaced.

Figure 6:
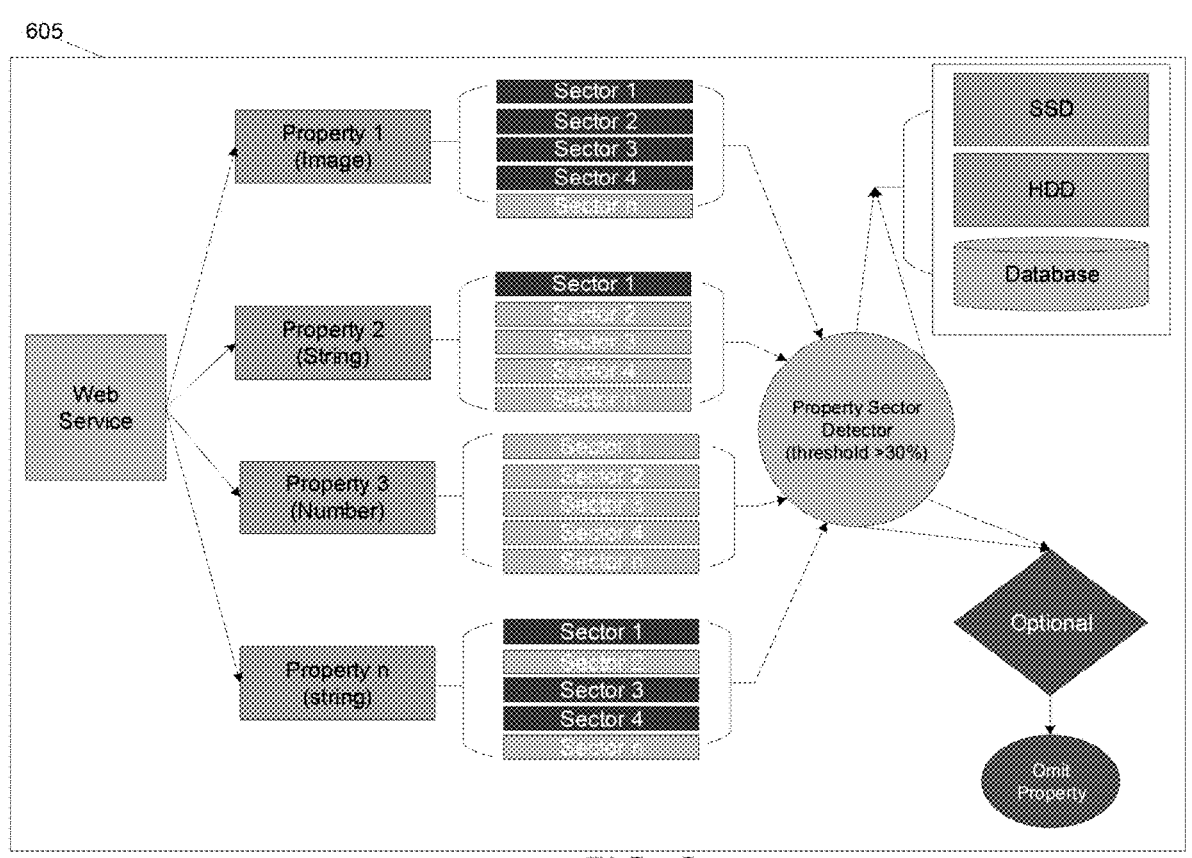
FIG. 6 depicts an illustrative graphical user interface for using API modification to address hardware depreciation in accordance with one or more example embodiments.

Additionally or alternatively, the administrator device 105 may display a graphical user interface similar to graphical user interface 605, which is shown in FIG. 6. For example, the administrator device 105 may display the sectors needed for each property, and may highlight (e.g., as shown in light grey in the figure) sectors that have failed. In some instances, this may be a dynamic interface, which may be updated in real time as repairs and/or replacements are made to the storage system 103 (e.g., the colors of the sector elements may change to reflect the repair).

In some instances, based on the hardware replacement notification, an employee corresponding to the administrator device 105 may cause the storage system 103 to be repaired and/or replaced. Although sending of a notification to prompt manual replacement/repair of the storage system 103 is described, in some instances, the property sector detection platform 102 may automatically cause an update and/or repair of the storage system 103. For example, the property sector detection platform 102 may automatically push a software update, reset signal, repair signal, and/or other information to the storage system 103, which may, e.g., cause the storage system 103 to automatically repair itself to a level that satisfies the performance threshold (e.g., an adequate number of sectors are functional).

At step 214, once the repair or replacement of the storage system 103 has occurred, the property sector detection platform 102 may update the property sector performance log. For example, upon detecting that the performance threshold was not satisfied, the property sector detection platform 102 may have temporarily modified the property sector performance log to indicate that collection of information for the first property (and/or the entire first API given that the first property was identified as mandatory) should be temporarily suspended. Accordingly, once the necessary repair or replacement of the storage system 103 has occurred (for example, a notification that the repair/replacement has been completed may be received by the storage system 103), the property sector detection platform 102 may update the log to indicate that collection of information for the first property and/or first API may be resumed. In some instances, the property sector detection platform 102 may send an automated signal to the API service host system 104, directing the API service host system 104 to resume collection of the information of the first property (which may, e.g., cause the API service host system 104 to collect the information going forward).

In some instances, this sector testing and logging process may be performed for a plurality of different APIs, their corresponding properties, and the corresponding sectors (e.g., the sectors for each property for a given API (of a plurality of APIs) as shown in FIG. 6. In some instances, this testing/logging may occur at a predetermined interval (e.g., once per day, or the like).

Figure 2D:
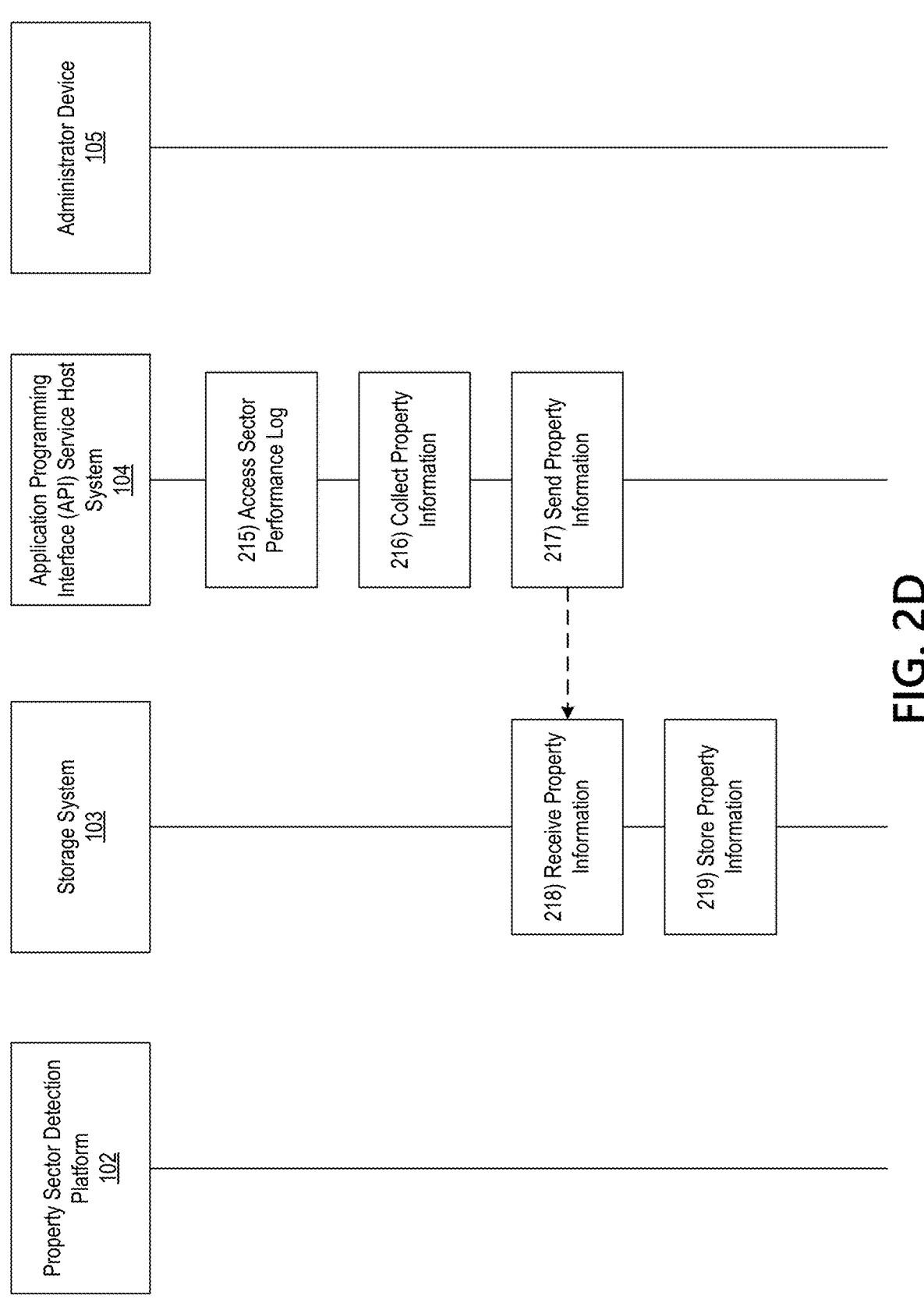

Referring to FIG. 2D, at step 215, the API service host system 104 may access the sector performance log. For example, the API service host system 104 may be in the process of making API calls for the first API, and may access the sector performance log to identify what information should be collected. For example, the API service host system 104 may access a sector performance log similar to sector performance log 405, which is shown in FIG. 4. In doing so, the API service host system 104 may identify which properties have information to be collected for the first API (e.g., properties #1 and #2), and of those, which have a current status of "collect" (e.g., property #1).

At step 216, the API service host platform 104 may collect the information for the properties identified in the sector performance log. For example, the API service host platform 104 may make API calls to the storage locations of the information for the identified properties (e.g., property #1) to obtain the corresponding information (e.g., image information, text information, video information, number information, and/or other information). In some instances, however, the API service host platform 104 might not collect information for a particular property corresponding to an API (e.g., property #2), based on the sector performance log, which may identify that sector performance does not support collection of such information.

At step 217, the API service host platform 104 may send the API property information, collected at step 216, to the storage system 103. In some instances, the API service host platform 104 may send the API property information while a wired or wireless data connection is established between the API service host platform 104 and the storage system 103. In some instances, the API service host platform 104 may also send one or more commands that may cause the storage system 103 to store the API property information (e.g., using a specified number of sectors, or the like).

At step 218, the storage system 103 may receive the API property information sent at step 217. For example, the storage system 103 may receive the API property information while a wired or wireless data connection is established between the storage system 103 and the API service host platform 104. In some instances, the storage system 103 may also receive the one or more commands directing the storage system 103 to store the API property information.

At step 219, based on or in response to the one or more commands directing the storage system 103 to store the API property information, the storage system 103 may store the API property information. For example, the storage system 103 may store the information for the first property using a specified number of sectors of the storage system 103.

Figure 5:
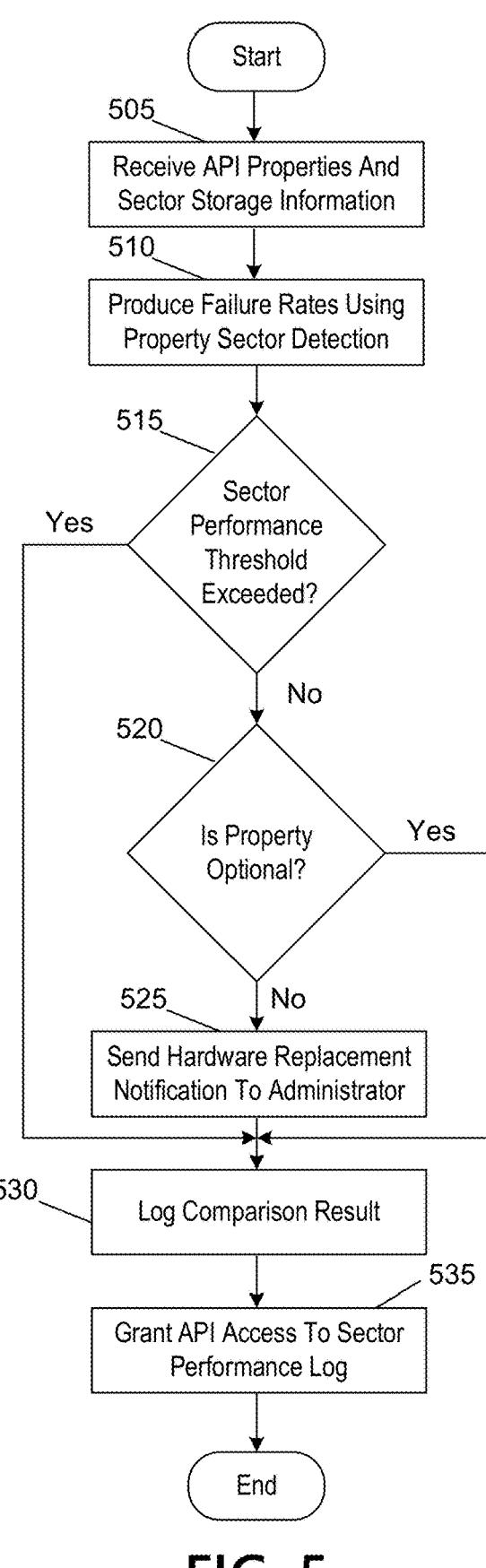
FIG. 5 depicts an illustrative method for using API modification to address hardware depreciation in accordance with one or more example embodiments.

FIG. 5 depicts an illustrative method for using API modification to address hardware depreciation in accordance with one or more example embodiments. At step 505, a computing platform may receive API properties and sector storage information. At step 510, the computing platform may use property sector detection to identify performance of a storage system (e.g., success and/or failure rates of the corresponding sectors). At step 515, the computing platform may compare the performance to a sector performance threshold. If the computing platform identifies that the sector performance threshold is met or exceeded, the computing platform may proceed to step 530. Otherwise, if the computing platform identifies that the sector performance threshold is not met or exceeded, the computing platform may proceed to step 520.

At step 520, the computing platform may identify whether or not an identified property is optional. If the property is optional, the computing platform may proceed to step 530. Otherwise, if the property is mandatory, the computing platform may proceed to step 525. At step 525, the computing platform may send a hardware replacement notification to an administrator device. At step 530, the computing platform may log results of the performance comparison in a sector performance log. At step 535, the computing platform may receive a request to access the sector performance log and may grant access accordingly.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform comprising:
at least one processor;
a communication interface communicatively coupled to the at least one processor; and
memory storing computer-readable instructions that, when executed by the at least one processor, cause the computing platform to:
  receive, from an application programming interface (API) host service, API property identifiers and corresponding sector storage information;
  test, for a first property corresponding to a first API property identifier of the API property identifiers, a plurality of sectors of a storage system used to store information for the first property, wherein testing the first property comprises:
    identifying, based on the plurality of sectors of the storage system and the sector storage information for the first property, a number of sector groups that may be used by the storage system to store the information for the first property,
attempting storage, in each of the sector groups, of the information for the first property,
identifying a number of failed sectors, of the plurality of sectors of the storage system, that failed to successfully complete the storage and a number of successful sectors, of the plurality of sectors of the storage system, that successfully completed the storage, and
identifying, by dividing the number of successful sectors by a number of the plurality of sectors of the storage system, a performance success rate;
compare the performance success rate to a performance threshold;
based on identifying that the performance success rate meets or exceeds the performance threshold, update a property sector detection log to indicate that collection of the information for the first property is supported by the storage system; and
based on identifying that the performance success rate is less than the performance threshold, perform one or more storage mitigation actions for the first property, wherein the one or more storage mitigation actions comprise:
identifying, based on a list of mandatory properties, whether collection of the information for the first property is optional;
based on identifying that the collection of the information for the first property is optional, update the property sector detection log to indicate that the collection of the information for the first property should not be performed; and
send, to the API host service, an automated signal indicating that the collection of the information for the first property should not be performed, wherein sending the automated signal causes the API host service to skip collection of the information for the first property while collecting information for the properties corresponding to the remaining API identifiers.

2. The computing platform of claim 1, wherein the API property identifiers indicate properties, corresponding to the API host service, for which information is collected.

3. The computing platform of claim 2, wherein the sector storage information indicates, for each of the properties, a number of sectors needed to store the corresponding information.

4. The computing platform of claim 1, wherein the property identifiers indicate one or more of: an image, text, a video, or a number.

5. The computing platform of claim 1, wherein the memory stores additional computer-readable instructions that, when executed by the at least one processor, cause the computing platform to:
identify a number of times within a predetermined period of time that the first property is accessed; and
dynamically adjust the performance threshold based on the identified number of times, wherein the performance threshold is dynamically reduced or increase proportionally based on the identified number of times.

6. The computing platform of claim 1, wherein the property detection sector log indicates API host service identifiers, the API property identifiers, and collection statuses of the API property identifiers.

7. The computing platform of claim 1, wherein the memory stores additional computer-readable instructions that, when executed by the at least one processor, further cause the computing platform to:

based on identifying that the collection of the information for the first property is mandatory:

update the property sector detection log to indicate that the collection of the information for the first property should be temporarily suspended;

send, to an administrator device, a hardware replacement notification and one or more commands directing the administrator device to display the hardware replacement notification, wherein sending the one or more commands directing the administrator device to display the hardware replacement notification causes the administrator device to display the hardware replacement notification, and wherein the hardware replacement notification indicates that the storage system should be replaced;

receive, from the administrator device, an indication that the storage system has been replaced; and update the property sector detection log to indicate that the collection of the information for the first property should be resumed.

8. The computing platform of claim 1, wherein the memory stores additional computer-readable instructions that, when executed by the at least one processor, further cause the computing platform to:

based on identifying that the collection of the information for the first property is mandatory, perform an automated repair of the storage system.

9. The computing platform of claim 1, wherein the storage system comprises one of: a solid state drive (SSD), hard disk drive (HDD), or database server.

10. The computing platform of claim 1, wherein testing the plurality of sectors occurs at a predetermined interval.

11. The computing platform of claim 1, wherein the API host service is configured to:

identify, by accessing the property sector detection log, that the information for the first property should be collected;

identify the information for the first property; and store, using a subset of the plurality of sectors of the storage system corresponding to the sector storage information for the first property, the information for the first property.

12. A method comprising:

at a computing platform comprising at least one processor, a communication interface, and memory:

receiving, from an application programming interface (API) host service, API property identifiers and corresponding sector storage information;

testing, for a first property corresponding to a first API property identifier of the API property identifiers, a plurality of sectors of a storage system used to store information for the first property, wherein testing the first property comprises:

identifying, based on the plurality of sectors of the storage system and the sector storage information for the first property, a number of sector groups that may be used by the storage system to store the information for the first property, attempting storage, in each of the sector groups, of the information for the first property, identifying a number of failed sectors, of the plurality of sectors of the storage system, that failed to successfully complete the storage and a number of successful sectors, of the plurality of sectors of the storage system, that successfully completed the storage, and identifying, by dividing the number of successful sectors by a number of the plurality of sectors of the storage system, a performance success rate;

compare the performance success rate to a performance threshold;

based on identifying that the performance success rate meets or exceeds the performance threshold, updating a property sector detection log to indicate that collection of the information for the first property is supported by the storage system; and based on identifying that the performance success rate is less than the performance threshold, performing one or more storage mitigation actions for the first property, wherein the one or more storage mitigation actions comprise:

identifying, based on a list of mandatory properties, whether collection of the information for the first property is optional;

based on identifying that the collection of the information for the first property is optional, update the property sector detection log to indicate that the collection of the information for the first property should not be performed; and send, to the API host service, an automated signal indicating that the collection of the information for the first property should not be performed, wherein sending the automated signal causes the API host service to skip collection of the information for the first property while collecting information for the properties corresponding to the remaining API identifiers.

13. The method of claim 12, wherein the API property identifiers indicate properties, corresponding to the API host service, for which information is collected.

14. The method of claim 13, wherein the sector storage information indicates, for each of the properties, a number of sectors needed to store the corresponding information.

15. The method of claim 12, wherein the property identifiers indicate one or more of: an image, text, a video, or a number.

16. The method of claim 12, wherein the memory stores additional computer-readable instructions that, when executed by the at least one processor, cause the computing platform to:

identify a number of times within a predetermined period of time that the first property is accessed; and dynamically adjust the performance threshold based on the identified number of times, wherein the performance threshold is dynamically reduced or increase proportionally based on the identified number of times.

17. The method of claim 12, wherein the property detection sector log indicates API host service identifiers, the API property identifiers, and collection statuses of the API property identifiers.

18. One or more non-transitory computer-readable media storing instructions that, when executed by a computing platform comprising at least one processor, a communication interface, and memory, cause the computing platform to:

receive, from an application programming interface (API) host service, API property identifiers and corresponding sector storage information;

test, for a first property corresponding to a first API property identifier of the API property identifiers, a plurality of sectors of a storage system used to store information for the first property, wherein testing the first property comprises:

identifying, based on the plurality of sectors of the storage system and the sector storage information for the first property, a number of sector groups that may be used by the storage system to store the information for the first property, attempting storage, in each of the sector groups, of the information for the first property, identifying a number of failed sectors, of the plurality of sectors of the storage system, that failed to successfully complete the storage and a number of successful sectors, of the plurality of sectors of the storage system, that successfully completed the storage, and identifying, by dividing the number of successful sectors by a number of the plurality of sectors of the storage system, a performance success rate;

compare the performance success rate to a performance threshold;

based on identifying that the performance success rate meets or exceeds the performance threshold, update a property sector detection log to indicate that collection of the information for the first property is supported by the storage system; and based on identifying that the performance success rate is less than the performance threshold, perform one or more storage mitigation actions for the first property, wherein the one or more storage mitigation actions comprise:

identifying, based on a list of mandatory properties, whether collection of the information for the first property is optional;

based on identifying that the collection of the information for the first property is optional, update the property sector detection log to indicate that the collection of the information for the first property should not be performed; and send, to the API host service, an automated signal indicating that the collection of the information for the first property should not be performed, wherein sending the automated signal causes the API host service to skip collection of the information for the first property while collecting information for the properties corresponding to the remaining API identifiers.

\* \* \* \* \*